United States Patent [19]

Holley

[11] Patent Number: 4,722,283
[45] Date of Patent: Feb. 2, 1988

[54] MAGNETIC PICK UP SYSTEM FOR RAIL BEDS AND METHOD

[75] Inventor: John D. Holley, Montgomery, Ala.

[73] Assignee: Holley Engineering Company, Inc., Montgomery, Ala.

[21] Appl. No.: 934,822

[22] Filed: Nov. 25, 1986

[51] Int. Cl.$^4$ .............................................. B61F 19/06
[52] U.S. Cl. .................................. 104/279; 198/510.1; 198/803.6
[58] Field of Search ....................... 104/9, 16, 17, 279; 209/215, 219; 198/510.1, 803.6

[56] References Cited

U.S. PATENT DOCUMENTS

| | | | |
|---|---|---|---|
| 3,690,264 | 9/1972 | Plasser et al. | 104/17 R |
| 3,731,455 | 5/1973 | Theurer | 53/391 |
| 3,943,858 | 3/1976 | Dieringer et al. | 104/16 |
| 4,225,429 | 9/1980 | Holley | 209/215 |
| 4,241,663 | 12/1980 | Lund et al. | 104/16 |
| 4,478,152 | 10/1984 | Holley | 104/279 |
| 4,561,198 | 12/1985 | Holley | 37/104 |

Primary Examiner—Robert B. Reeves
Assistant Examiner—Thomas W. Kearns
Attorney, Agent, or Firm—Kerkam, Stowell, Kondracki & Clarke

[57] ABSTRACT

A magnetic pick up system for tie plates uses a pick up head having a rotatable wheel with a plurality of fingers pivotably attached to the wheel. The fingers, which are magnet pole pieces adapted to magnetically grip tie plates and lift them from the ground, are pulled outwardly by centrifical force and serve to extend the effective distance of a magnetic circuit including block magnets mounted within the head. Tie plates lifted by the magnetic pick up head are deposited upon a conveyor belt which lifts them to a hopper upon a rail vehicle. An operator control adjacent to the pick up head provides easy and quick movement of the pick up head both vertically and horizontally allowing an operator walking along beside the pick up head to insure that the pick up head satisfactorily picks up any tie plates upon the roadbed.

20 Claims, 7 Drawing Figures

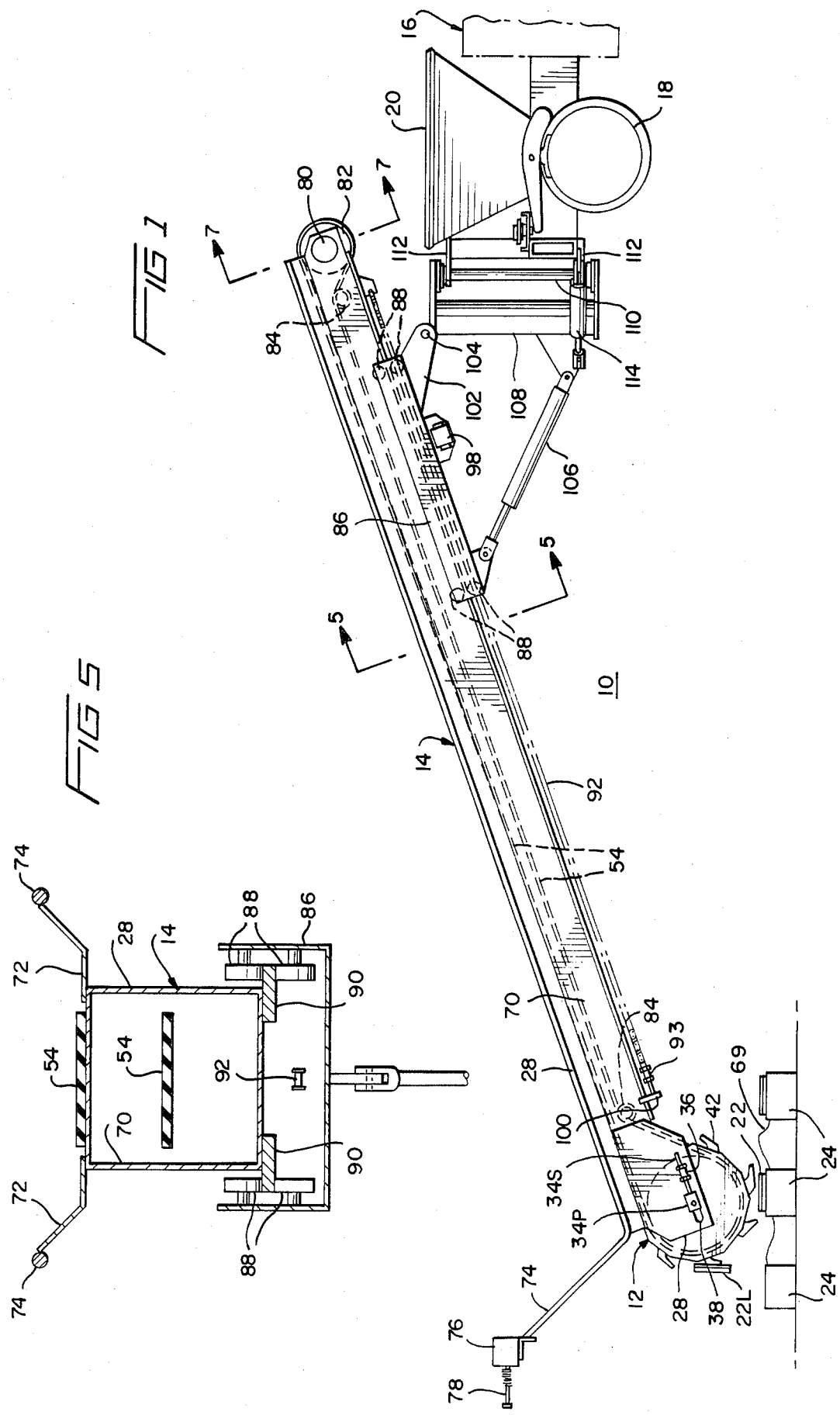

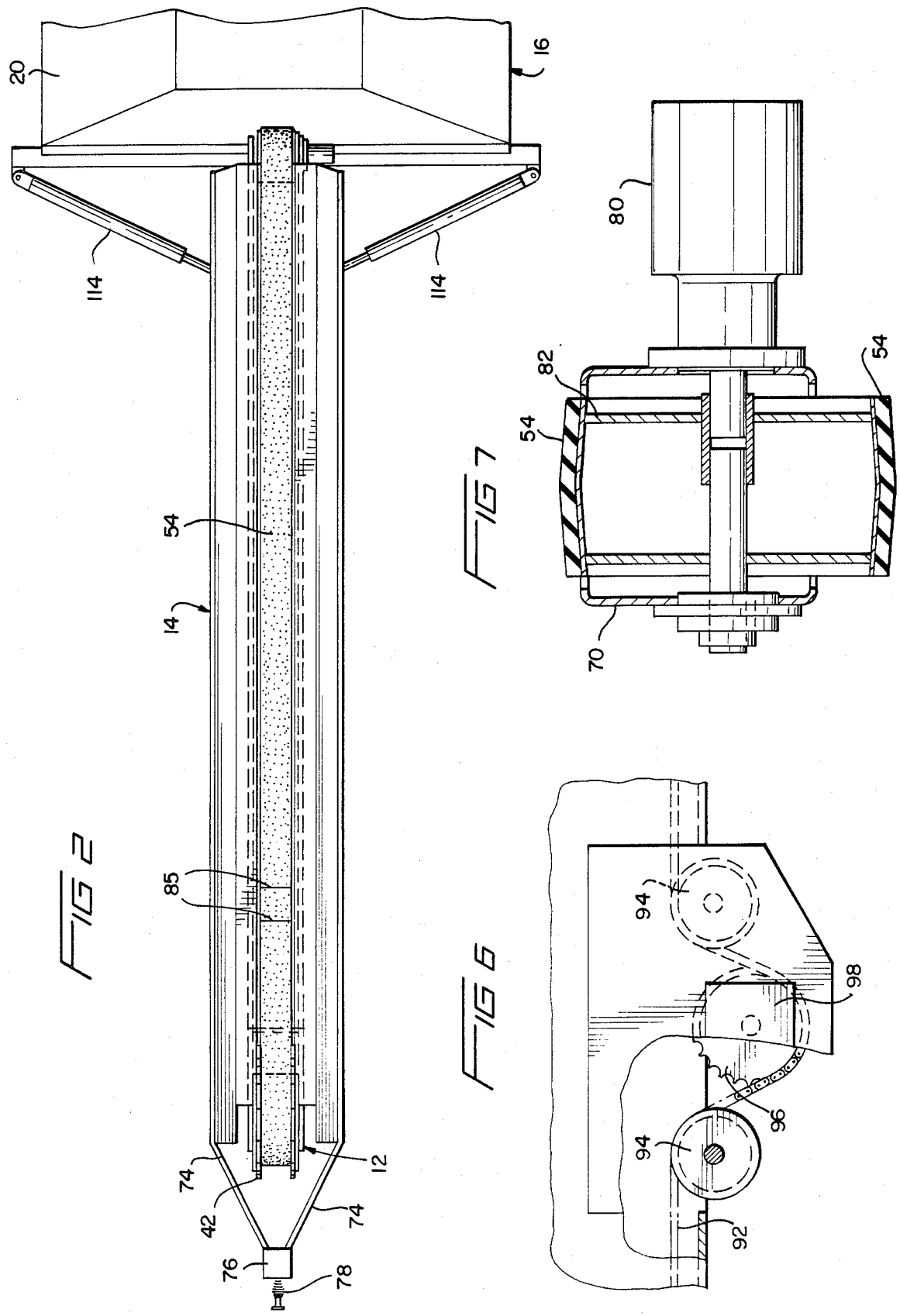

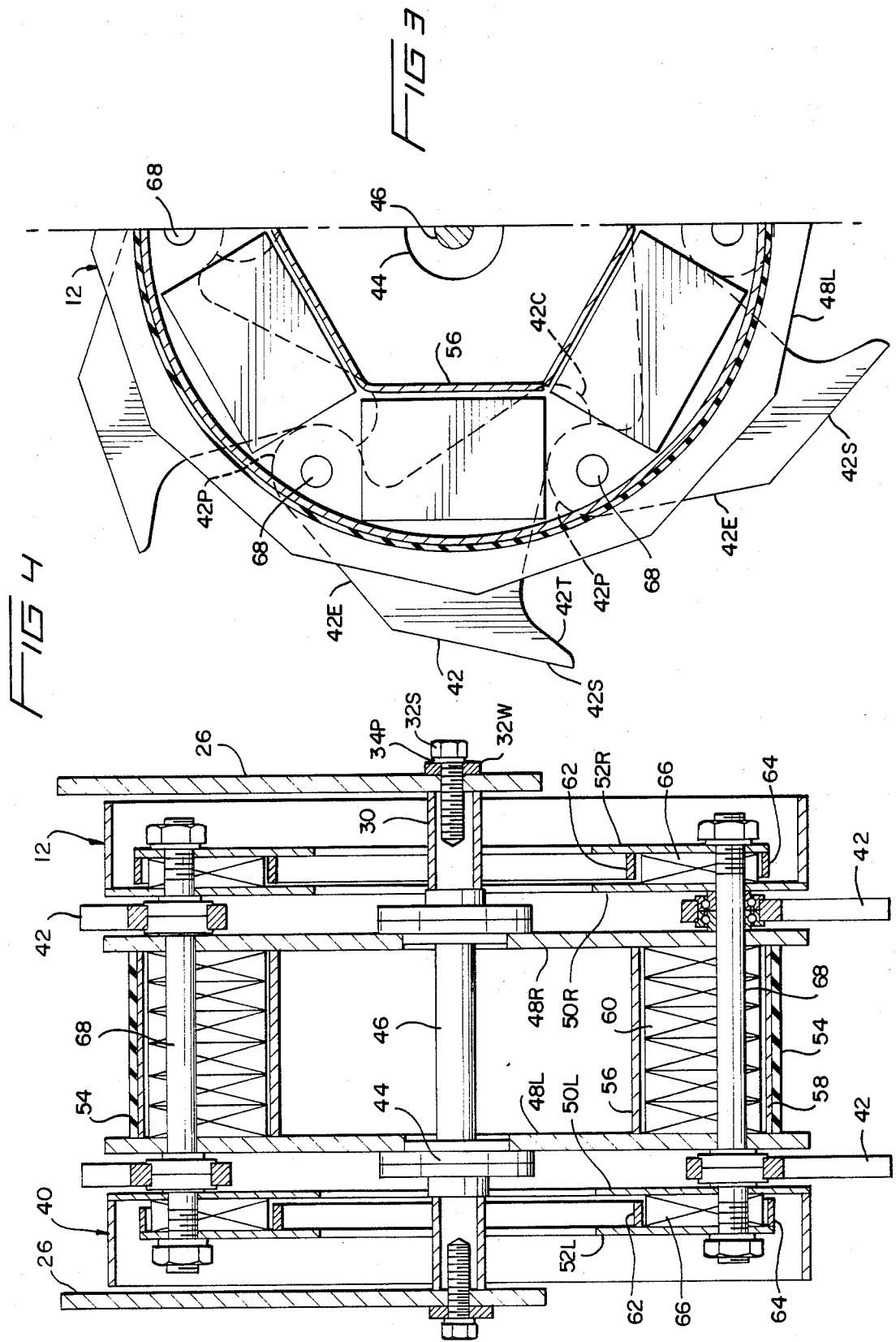

MAGNETIC PICK UP SYSTEM FOR RAIL BEDS AND METHOD

BACKGROUND

This invention relates to a magnetic pick up system and associated method. More specifically, this invention relates to a magnetic pick up system and method for picking up articles from a railway roadbed.

When laying a new railroad track or when laying new rails upon a previously existing railroad track, it is necessary to provide tie plates upon the railroad ties. One tie plate is required for each side of each tie and typically more than 3,000 tie plates would be required for one mile of track. The tie plates may be manually placed upon each of the ties. Alternately, various machines have been developed in an attempt to avoid the high labor associated with manual placement of the tie plates. As such machines are required to place a large number of tie plates upon ties, it will be appreciated that they require the feeding of a large number of tie plates to them. A crane with an electromagnetic pick up head or other techniques have been used to pick up tie plates along the roadbed. The tie plates will have been previously distributed along the roadbed by another vehicle.

Although prior techniques such as cranes with electromagnetic heads have generally been adequate to lift the tie plates off the roadbed and into a storage bin or similar part of the tie plate placing vehicle, they have often been subject to one or more of several disadvantages.

Prior techniques of loading tie plates onto the tie plate placing vehicles have often required that the vehicle stop its movement. For example, the crane arrangement with an electromagnetic head may fail to pick up some tie plates if the vehicle is moving.

The present inventor's prior U.S. Pat. No. 4,225,429 issued on Sept. 30, 1980 discloses a "Vehicle For Cleaning Railway Roadbeds Of Magnetic Articles" using a lower roller or pulley provided with permanent magnets in order to pick up magnetic articles from a railway road bed. The articles are carried up to a vehicle by a conveyor belt.

The present inventor's prior U.S. Pat. No. 4,478,152 entitled "Railroad Scrap Pick Up Machine" issued on Oct. 23, 1984 discloses an arrangement using a magnetic wheel with permanent magnets which are used to pick up tie plates from a railroad bed.

The above and other techniques for picking up magnetic objects from a roadbed have several disadvantages. Those systems which use a magnetic wheel travelling along the roadbed have a tendency to wear out. Additionally, obstacles in the roadbed, or simply a rise in the level of the roadbed, may cause damage to the magnetic wheel. On the other hand, spacing of such a magnetic head above the ground will likely cause it to fail to pick up a tie plate or other object which is supposed to be lifted from the ground.

A further disadvantage of numerous prior techniques for picking up magnetic articles from a railway roadbed is that such techniques often either require a large number of magnetic pick up heads (thus increasing costs and complexity) in order to pick up magnetic articles across the width of the roadbed or they lack the ability to conveniently pick up magnetic articles which are spaced in a sideways direction (i.e., spaced perpendicularly to the direction in which the rails or rail extend).

A further disadvantage of numerous prior techniques is their inability to provide an arrangement where an operator may control a magnetic pick up head from a position adjacent to the magnetic pick up head (as opposed to a position up on a vehicle).

Yet another disadvantage of numerous prior techniques is the inability of magnetic pick up heads to be capable of convenient up and down movement as the roadbed terrain and obstacles dictate.

OBJECTS AND SUMMARY OF THE INVENTION

Accordingly, it is a primary object of the present invention to provide a new and improved magnetic pick up system and method.

A more specific object of the present invention is to provide a magnetic pick up system wherein a pick up head is protected from damage due to roadbed obstacles or sudden rises in height in the roadbed.

Another object of the present invention is to provide a magnetic pick up system which is operable while the vehicle moves along the roadbed.

Yet another object of the present invention is to provide a magnetic pick up system which is highly efficient at picking up objects on a railway roadbed.

A still further object of the present invention is to provide a magnetic pick up system wherein a pick up head may be conveniently controlled by an operator immediately adjacent to the pick up head so as to quickly move the pick up head vertically or sideways when appropriate.

A still further object of the present invention is to avoid the stated disadvantages of the prior pick up systems.

The above and other advantages of the present invention which will become apparent as the description proceeds are realized by the magnetic pick up system comprising: a pick up head having a wheel rotatable about a wheel axis; and a plurality of fingers operable to magnetically grip and lift objects from the ground, each finger movably mounted to the wheel to move between an inner position relatively close to the wheel axis and an outer position relatively far from the wheel axis. The plurality of fingers are normally in their outer positions when the magnetic pick up system is operating, but each finger is operable to automatically move towards its inner position if the finger hits the ground or an obstacle on the ground such that the pick up head will avoid damage. The magnetic pick up system is operable for picking up objects upon a rail track bed and further comprises a rail vehicle operable to move along the rail track bed, the pick up head being supported by the rail vehicle. Each of the fingers is pulled to its outer position by centrifical force from rotation of the wheel and its outer position is at least partly outside of an outer periphery of the wheel. Each finger is a magnetic pole piece. The plurality of fingers includes two sets of fingers disposed in two parallel planes, the wheel axis being normal to each of the planes. Each of the fingers is pivotably mounted to the wheel and the wheel has a plurality of permanent magnets in circuit with the fingers. The system further comprises a conveyor belt assembly mounted to the rail vehicle at an upper end and having the pick up head mounted at a lower end, the conveyor belt assembly having a frame and a conveyor belt mounted thereon. The conveyor belt is operable to receive objects picked up by the pick up head and convey them to the vehicle. The system further comprises an operator control mounted to the lower end and a height changer responsive to the operator control and controlling the height of the lower end and the pick up head mounted thereon such that an operator adjacent to the lower end can control the height of the pick up head and maintain the wheel above the ground, while the fingers extend out to pick up objects on the ground. The system further comprises a sideways changer responsive to the operator control and controlling the position of the lower end and the pick up head mounted thereon in a sideways direction perpendicular to the direction of vehicle travel.

The present invention may alternately be described as a magnetic pick up system for picking up objects upon a rail track bed comprising: a rail vehicle operable to move along a rail track bed; and a pick up head supported by the rail vehicle and having a closed-loop head conveyor with an outer periphery and a plurality of fingers operable to magnetically grip objects and lift them from the bed, each finger movably mounted to the head conveyor to move between an outer position at least partly outside of the outer periphery and an inner position inward from the outer position. The plurality of fingers are normally in the outer positions when the magnetic pick up system is operating, but each finger is operable to automatically move towards its inner position if the finger hits the ground or an obstacle on the ground such that the pick up head will avoid damage. The head conveyor is a wheel rotatable about a wheel axis.

The method of picking up objects from a rail track bed according to the present invention comprises the steps of: forwardly moving a pick up system including a pick up head having a wheel and a plurality of fingers movably mounted to the wheel along its rail track bed with the wheel spaced above the bed; rotating the wheel about a wheel axis; moving the plurality of fingers from inner positions relatively close to the wheel axis to outer positions relatively far from the wheel axis; magnetically gripping objects with the plurality of fingers to lift the objects off the rail track bed; and automatically retracting a finger from its outer position towards its inner position upon it striking the ground or an obstacle on the ground such that the pick up head will avoid damage. The plurality of fingers are moved to their outer positions by centrifical force and the outer positions are at least partly outside of an outer periphery of the wheel. Each of the plurality of fingers is a magnetic pole piece in circuit with at least one permanent magnet. The pick up head is supported by a rail vehicle moving forwardly and further comprising the step of having an operator adjacent to the pick up head causing sideways movement of the pick up head.

BRIEF DESCRIPTION OF THE DRAWINGS

The above and other features of the present invention will be more readily understood when the following detailed description is considered in conjunction with the accompanying drawings wherein like characters represent like parts throughout the several views and in which:

FIG. 1 shows a side view of the present invention.

FIG. 2 is a top view of the present invention.

FIG. 3 shows an enlarged side view of a half of a magnetic pick up head according to the present invention.

FIG. 4 shows a cross section view of the pick up head of the present invention.

FIG. 5 shows a cross section view taken along lines 5—5 of FIG. 1.

FIG. 6 shows an enlarged side view of a system for moving a conveyor belt assembly of the present invention into a stowage position.

FIG. 7 shows a cross-section view taken along lines 7—7 of FIG. 1.

DETAILED DESCRIPTION

As shown in the side view of FIG. 1 and top view of FIG. 2, the magnetic pick up system 10 according to the present invention comprises a pick up head 12 mounted at the lower end of a conveyor belt assembly 14 which has its upper end supported by a vehicle 16. The vehicle 16 includes a back wheel 18 for moving along a rail (not shown) and a hopper 20. The wheel 18 is one of a pair of back wheels (the other wheel is not shown but would be in line with the wheel 18). The vehicle 16 is only partially shown and would preferrably also include a pair of front wheels and a plate placing system as shown and described in the present inventor's U.S. patent application Ser. No. 826,008 filed Feb. 4, 1986 and entitled "Railroad Plate Placer", assigned to the assignee of the present application, and hereby incorporated by reference. Generally, the pick up head 12 picks up tie plates 22 from the roadbed having ties 24 and, by way of the conveyor belt assembly 14, deposits the tie plates within hopper 20 from which the tie plates may be removed and placed in proper position upon one of the ties 24 by the system disclosed in the "Railroad Plate Placer" application. The vehicle would be moving along the roadbed on two of its four wheels along one side and would be supported by a crawler track along the other side as described in the incorporated by reference patent application. (For ease of illustration, the rail or rails on which the vehicles 16 is preceeding are not shown and only a few of the ties 24 are illustrated.)

Continuing to consider FIG. 1, but also considering the views of FIGS. 3 and 4, the structure of the pick up head 12 will be discussed in detail.

The pick up head 12 is mounted upon mounting flange portions 26 of a frame 28 part of the conveyor belt assembly 14. As the discussion proceeds, it will be useful to keep in mind that the left side of the system 10 (the view from the opposite direction of the right side view of FIG. 1) is generally identical to that shown in FIG. 1 except where otherwise noted.

The head 12 include shafts 30 which are secured to corresponding flanges 26 by a lock washer 32W and associated screw 32S. A steel plate 34P is secured between the screw 32S and washer 32W and the plate is welded to a lead screw 34S which extends through an anchor 36. (The plate 34P is shown enlarged in FIG. 1.) The anchor 36 is secured to the outside of the flange 26 and allows one to adjust the mounting of head 12 by securing the screw 32S at different positions within the slot 38 (FIG. 1 only) by tightening the illustrated nuts shown at either side of the anchor 36 to secure the lead screw 34S and associated plate 34P at a particular location relative to the conveyor belt assembly 14.

The pick up head 12 includes a wheel 40 and a plurality of fingers 42 pivotably mounted upon the wheel. The wheel 40 is rotatably mounted upon the shafts 30 by way of bearings 44 and central shaft 46. The wheel 40 includes carbon steel pole piece plates 48R, 48L, 50R, 50L, 52R, and 52L and a conveyor belt 54 around a non-magnetic (i.e., stainless steel) cylinder 58. Piece 56 and cylinder 58 secure a large number of circumferentially arranged block magnets 60, whereas inner and outer pieces 62 and 64 are used to secure block magnets 66 which outboard of the fingers 42. As shown, the fingers 42 are arranged in two sets of parallel planes, a right set of fingers 42 just inside of the right pole piece plate 50R and a left set of fingers 42 just inside of the left pole piece plate 50L. Each plane is perpendicular to a wheel rotation axis extending centrally lengthwise through the shaft 46. As shown, the fingers 42 are pivotably mounted upon shafts 68 which are circumferentially spaced around the wheel 40. The fingers 42, which use the illustrated ball bearings for their mountings upon shafts 68, include a pivot portion 42E, a leading edge 42E which is swept back as shown in FIG. 3, a side edge 42S, and a catch portion 42C. As best shown in FIG. 3, the catch portion 42C hits the pivot portion 42P of an adjacent one of the fingers 42 such that the finger 42 is limited in its outward pivoting movement about the finger shaft 68. Each of the fingers additionally includes a stop portion 42T which keeps the finger from moving beyond a certain inward position. That is, with reference to FIG. 3, the finger shown at the middle left side of the figure may pivot about shaft 68 in a counter-clockwise direction until the stop portion 42T hits the pivot portion 42P of the finger immediately below the middle finger. In this manner, rotation of the wheel 40 normally causes the fingers 42 to be disposed in an outer position as illustrated in FIG. 3, but the fingers may rotate inwardly until the stop 42T hits the adjacent pivot portion 42P upon the edges 42E or 42S of the finger hitting an obstruction or running into a high roadbed level or tie. As shown in FIG. 3, the outer position of fingers 42 has at least part of the fingers outside the outer periphery of the wheel 40, which, in the view of FIG. 3, corresponds to the outer periphery of the piece 48L. Each of the fingers 42 is made of carbon steel so as to serve as a pole piece in magnetic circuit with the inboard magnetic blocks 60 and the outboard magnetic blocks 66 such that the fingers 42 will have extremely high magnetic forces to attract tie plates and grip them against the fingers 42. As the fingers 42 are free to pivot slightly inwardly (within the angular range between the catch portion 42C and the stop portion 42T), the fingers 42 will be able to "bounce" radially inwardly towards shaft 46 so as to avoid being damaged by hard collisions. Additionally, the remainder of the head 12 may be kept above obstructions such as the ridge 69 (FIG. 1), thereby protecting the wheel 40 and generally the head 12 from damage. At the same time, the use of the pivotable pole piece fingers 42 allows one to extend the range of the block magnets 60 and 66 so as to reach out beyond the periphery of the wheel 40 and to pick up tie pieces 22 and lift them upwardly as shown for lifted tie plate 22L in FIG. 1.

With reference now to FIGS. 1 and 2 in conjunction with FIG. 5, the construction of the conveyor belt assembly 14 including frame 28 will be discussed. The frame 28 includes a lengthwise extending hollow rectangular member 70 having two side pieces 72 with a reinforcement bar 74 at the side thereof. The side pieces 72 are mounted on the top of the rectangular member 70. The bars 74 extend upwardly at the lower end of the conveyor belt assembly 14 and join together to support a controller box 76 having a control switch 78 which may be used to control the positioning of the head 12 as described below. The conveyor belt 54 extends in a closed loop about the top part of the rectangular member 70. Although the top rung of the conveyor belt 54 is shown immediately adjacent the top of member 70 in FIG. 5, the conveyor 54 could also be spaced slightly above the top of member 70. The conveyor belt 54 extends from the lower end of conveyor belt assembly 14 whereat it encircles the wheel 40 of head 12 and causes rotation of the wheel 40 by friction drive of cylinder 58. The conveyor belt 54, with reference to FIG. 7, is friction driven by a motor 80 by way of a drive cylinder 82 rotated by the motor 80. As shown in FIG. 7, the rectangular member 70 has an open top and an open bottom at its upper end to accommodate the drive cylinder 82 and the conveyor belt 54. The conveyor belt 54 extends between idlers 84, which may be used to adjust the tension of conveyor belt 54 if desired. The conveyor belt 54 may include a number of cleats or ridges 85 in order to insure that tie plates deposited on the conveyor belt 54 will travel upwardly without slippage. Only two of the cleats 85 are illustrated in FIG. 2, it being understood that a large number of equally spaced cleats would be included on the conveyor belt 54.

As best shown in FIGS. 1 and 5, the conveyor belt assembly 14 is mounted to the vehicle 16 by way of a support 86 having a plurality of rollers 88 (four rollers 88 on each side) which capture either of two members 90 extending lengthwise along the bottom of the rectangular member 70. As shown in FIG. 5, the members 90 insure that the conveyor belt assembly 14 lines up lengthwise parallel to the lengthwise direction of the support 86. At the same time, the members 90 allow the conveyor belt assembly 14 to be moved relative to the support 86 by virtue of the rollers 88 to a position determined by a chain 92 having a tension adjustor 93 at its lower end and extending past idlers 94 (referring to FIG. 6). The chain drive 92 is driven by a sprocket 96 (FIG. 6) which is in line with a side mounted motor 98 (FIG. 1 only). A stop 100 (FIG. 1) is mounted at the lower end of member 70 and serves to prevent the conveyor belt assembly 14 from moving too far up on the support 86. The stop 100 may simply contact either the support 86 or the rollers 88 and prevent further upward movement of the conveyor belt assembly 14 relative to the support 86. A similar stop (not shown) may be used at the upper end of the conveyor belt assembly 14 to prevent the assembly 14 from being moved too far down relative to the support 86.

With reference now to FIGS. 1 and 2, the mounting of the conveyor belt assembly 14 relative to the vehicle 16 will be discussed in detail. The conveyor belt assembly 14 is mounted to the support 86 and is free to move up and down upon an operator causing the motor 98 to drive the sprocket 96 (FIG. 6 only). The support 86 may move in a number of directions relative to the vehicle 16. In particular, the support 86 is connected to a flange 102 which has a pivot point 104 defining a horizontal pivot axis. Upon adjustment of a vertical adjustment or height changer cylinder 106, the support 86 will rotate about pivot axis 104 and, in turn, cause corresponding movement of the conveyor belt assembly 14 and the pick up head 12 mounted thereon. The flange 102 and cylinder 106 are each pivotably connected to a frame member 108 having a pivot rod 110. The pivot rod 110 extends through upper and lower brackets 112, which are fixed to the vehicle 16. The support frame 108 can rotate relative to the vehicle 16 upon activation of rotate-control cylinders 114. Activation of the rotate-control or sideways changer cylinders 114 will cause the pick up head 12 and conveyor belt assembly 14 to rotate about the vertical central axis extending through pivot rod 110. This allows movement of the pick up head 12 from side to side (i.e., transverse to the direction of movement of the vehicle).

OPERATION

The vehicle 16 may travel along the roadbed with the conveyor belt assembly 14 and the pick up head 12 in an upper storage position such that the pick up head 12 is quite far removed from the ground. When it desired to utilize the pick up system of the present invention, the motor 98 is activated to cause the drive sprocket 96 to pull the conveyor belt assembly 14 backwardly by acting upon the chain drive belt 92. The motor 98 may be activated by a switch (not shown) upon the vehicle 16 or, alternately, the switch 78 may be a three-way control joy stick switch such that pulling the switch 78 out causes the motor 98 to move the conveyor belt assembly 14 backward relative to the support 86, whereas pushing the switch 78 inward causes the motor 98 to move the conveyor belt assembly 14 forward relative to support 86. In either case, the conveyor belt assembly 14 is moved backward and is pivoted about axis 104 until the pick up head 12 is slightly above the ground as illustrated in the position of FIG. 1. The motor 80 is turned on to cause the conveyor belt 54 to move and the conveyor belt 54 causes rotation of the wheel 40. Rotation of the wheel 40 causes the fingers 42 to assume their radially outward positions (positions shown in FIG. 4) by virtue of centrifical force. As the vehicle 16 moves forwardly (i.e., rightwardly in FIG. 1), the wheel 40 of pick up head 12 rotates clockwise in the view of FIG. 1 and will pick up tie plates 22 off the ground. The ability of the pole piece fingers 42 to readily pivot inwardly and to extend the magnetic field of block magnets 60 and 66 (FIGS. 3 and 4) allows the bulk of the pick up head 12 to remain significantly above the ground and avoid damage due to any ground obstructions such as 69. The wheel 40, which may be considered as a head conveyor (the conveyor on the pick up head 12 itself), feeds the tie plates 22 to the conveyor belt 54 where upon they are lifted to the top end of the conveyor belt assembly 14 and may fall into the hopper 20. An operator who would walk along the ground behind the vehicle 16 may operate the switch 78 to modify the position of the head 12. By lifting the joy stick switch 78, the height changer cylinder 106 will be extended so as to pivot the conveyor belt assemby 14 about pivot axis 104. Likewise, the joy stick switch 78 may be pushed downwardly causing retraction of the cylinder 106 and lowering the pick up head 12 closer to the ground. Therefore, the operator walking along beside the operator control 78 can easily and quickly adjust the height of the head 12 as desirable. Additionally, the operator can push the joy stick control switch 78 to the right or left, thereby activating the sideways changing cylinders 114 to move the pick up head 12 to the right or left depending upon where the tie plates are located. Well known electrically operated hydraulic circuits may be used to cause the switch 78 to control the various hydraulic cylinders.

If the system includes the optional feature whereby the joy stick control 78 controls the motor 98 in addition to the various hydraulic cylinders, the operator walking along the ground next to switch 78 may move the conveyor belt assembly 14 and the pick up head mounted thereon by moving the conveyor belt assembly 14 relative to its support 86. For example, if the operator has missed picking up a tie plate at a particular location, he may move the conveyor belt assembly 14 downwardly relative to its support 86 in order to counteract the forward velocity of the vehicle 16. However, safety considerations such as avoiding having tie plates coming off the conveyor 54 forward of the hopper 20 and onto a person or persons riding on vehicle 16 may make it advisable to have a separate control switch for the motor 98.

If the operator walking along next to control switch 78 has passed a tie plate without the head 12 picking it up, the operator may simply toss the tie plate at the pick up head 12 and the fingers 42 will strongly magnetically grip the tie plate. If tie plates are concentrated in a big pile, they can be readily spread out to allow easier pick up. There is no need to stop the vehicle or take other drastic action because the combination of pick up head 12 and conveyor belt 54 provide a most efficient and easy to operate arrangement for picking up tie plates. A continuous stream of tie plates can be fed into hopper 20 and may be used for the tie plate placing system described in the inventor's incorporated by reference application.

During operation of the system, the fingers 42 will automatically retract from their outer positions towards their inner positions upon the finger 42 striking the ground or an obstacle on the ground.

Although various specific constructions have been shown herein, it is to be understood that these are for illustrative purposes only. Numerous modifications and adaptations will be readily apparent to those of ordinary skill in the art. Accordingly, the scope of the present invention should be determined by reference to the claims appended hereto.

What is claimed is:

1. A magnetic pick up system comprising: a pick up head having a wheel rotatable about a wheel axis; and a plurality of fingers operable to magnetically grip and lift objects from the ground, each finger movably mounted to said wheel to move between an inner position relatively close to said wheel axis and an outer position relatively far from said wheel axis; and wherein said plurality of fingers are normally in their outer positions when the magnetic pick up system is operating, but each finger is operable to automatically move towards its inner position if the finger hits the ground or any obstacle on the ground such that said pick up head will avoid damage.

2. The magnetic pick up system of claim 1 wherein the magnetic pick up system is operable for picking up objects upon a rail track bed and further comprises a rail vehicle operable to move along a rail track bed, said pick up head supported by said rail vehicle.

3. The magnetic pick up system of claim 2 wherein each finger is pulled to its outer position by centrifical force from rotation of said wheel and its outer position is at least partly outside of an outer periphery of said wheel.

4. The magnetic pick up system of claim 3 wherein each finger is a magnetic pole piece.

5. The magnetic pick up system of claim 4 wherein said plurality of fingers includes two sets of fingers disposed in two parallel planes, said wheel axis being normal to each of said planes.

6. The magnetic pick up system of claim 4 wherein each of said fingers is pivotably mounted to said wheel and said wheel has a plurality of permanent magnets in circuit with said fingers.

7. The magnetic pick up system of claim 4 further comprising a conveyor belt assembly having an upper end mounted to said rail vehicle and having said pick up head mounted at a lower end, said conveyor belt assembly having a frame and a conveyor belt mounted thereon, said conveyor belt operable to receive objects picked up by said pick up head and convey them to said vehicle.

8. The magnetic pick up system of claim 7 further comprising an operator control mounted to said lower end and height changer responsive to said operator control and controlling said height of said lower end and said pick up head mounted thereon such that an operator adjacent to said lower end can control the height of said pick up head and maintain said wheel about the ground, while said fingers extend out to pick up objects.

9. The magnetic pick up system of claim 8 further comprising a sideways changer responsive to said operator control and operable to move said lower end and said pick up head mounted thereon in a sideways direction perpendicular to the direction of vehicle travel.

10. A magnetic pick up sytem for picking up objects upon a rail track bed comprising: a rail vehicle operable to move along a rail track bed; and a pick up head supported by said rail vehicle and having a closed loop head conveyor with an outer periphery and a plurality of fingers operable to magnetically grip objects and lift them from the bed, each finger movably mounted to said head conveyor to move between an outer position at least partly outside of said outer periphery and an inner position inward from said outer position, and wherein said plurality of fingers are normally in their outer positions when the magnetic pick up system is operating, but each finger is operable to automatically move towards its inner position if the finger hits the ground or any obstacle on the ground such that said pick up head will avoid damage.

11. The magnetic pick up system of claim 10 wherein said head conveyor is a wheel rotatable about a wheel axis.

12. The magnetic pick up system of claim 11 wherein each finger is a magnetic pole piece.

13. The magnetic pick up system of claim 12 wherein each of said fingers is pivotably mounted to said wheel and said wheel has a plurality of permanent magnets in circuit with said fingers.

14. The magnetic pick up system of claim 13 wherein said plurality of fingers includes two sets of fingers disposed in two parallel planes, said wheel axis being normal to each of said planes.

15. The magnetic pick up system of claim 14 further comprising a conveyor belt assembly having an upper end mounted to said rail vehicle and having said pick up head mounted at a lower end, said conveyor belt assembly having a frame and a conveyor belt mounted thereon, said conveyor belt operable to receive objects picked up by said pick up head and convey them to said vehicle, and further comprising an operator control mounted to said lower end, and further comprising a sideways changer responsive to said operator control and operable to move said lower end and said pick up head mounted thereon in a sideways direction perpendicular to the direction of vehicle travel.

16. The magnetic pick up system of claim 15 further comprising a height changer responsive to said operator control and controlling said height of said lower end and said pick up head mounted thereon such that an operator adjacent to said lower end can control the height of said pick up head and maintain said wheel above the ground, while said fingers extend out to pick up objects.

17. A method of picking up objects from a rail track bed comprising the steps of:
  forwardly moving a pick up system including a pick up head having a wheel and a plurality of fingers movably mounted to said wheel along the rail track bed with the wheel spaced above the bed;
  rotating said wheel about a wheel axis;
  moving said plurality of fingers from inner positions relatively close to said wheel axis to outer positions relatively far from said wheel axis;
  magnetically gripping objects with said plurality of fingers to lift the objects off the rail track bed: and,
  automatically retracting a finger from its outer position towards its inner position upon it striking the ground or an obstacle on the ground such that the pick up head will avoid damage.

18. The method of claim 17 wherein the plurality of fingers are moved to their outer positions by centrifical force and the outer positions are at least partly outside of an outer periphery of the wheel.

19. The method of claim 18 wherein each of the plurality of fingers is a magnetic pole piece in circuit with at least one permanent magnet.

20. The method of claim 19 wherein the pick up head is supported by a rail vehicle moving forwardly and further comprising the step of having an operator adjacent to the pick up head controlling sideways movement of the pick up head.

* * * * *